United States Patent

[11] 3,614,775

[72] Inventor John W. Brean
Cincinnati, Ohio
[21] Appl. No. 760,594
[22] Filed Sept. 18, 1968
[45] Patented Oct. 19, 1971
[73] Assignee D. H. Baldwin Company
Cincinnati, Ohio

[54] OPTICAL ENCODER WITH PNPN DIODE SENSING
4 Claims, 4 Drawing Figs.

[52] U.S. Cl. .......... 340/347 P,
250/211 J, 307/324
[51] Int. Cl. .......... G08c 9/06,
H03k 13/02
[50] Field of Search .......... 250/211;
307/311, 305, 324; 340/347

[56] References Cited
UNITED STATES PATENTS

| | | | |
|---|---|---|---|
| 3,020,534 | 2/1962 | Jones | 340/347 |
| 3,043,962 | 7/1962 | Jones | 340/347 X |
| 3,270,235 | 8/1966 | Loebner | 250/211 X |
| 3,344,278 | 9/1967 | Yanai | 250/211 |
| 3,366,793 | 1/1968 | Svedberg | 307/311 X |
| 3,369,132 | 2/1968 | Fang | 307/311 X |
| 3,505,527 | 4/1970 | Slana | 307/311 X |

*Primary Examiner*—Maynard R. Wilbur
*Assistant Examiner*—Michael K. Wolensky
*Attorneys*—Burmeister, Kulie and Southard

ABSTRACT: An optical analog-to-digital encoder is disclosed employing light responsive PNPN switching diodes to respond to transparent sectors of a code member. The encoder utilizes a constant light source and an electrical pulse generator connected to the diodes for sampling.

In one embodiment of the encoder a separate output is obtained for each of a plurality of switching diodes. In another embodiment, the output of a plurality of switching diodes appears on a single pair of output terminals sequentially.

Inventor
JOHN W. BREAN
By Burmeister, Kulie & Southard
Attorneys

Inventor
JOHN W. BREAN
By Burmeister, Kulie & Southard
Attorneys

OPTICAL ENCODER WITH PNPN DIODE SENSING

The present invention relates generally to devices for digitizing shaft angle position, and more particularly to photoelectric encoders for this purpose.

Optical encoders are commonly used to transform analog information in the form of position of a rotatable shaft to digital information. Optical encoders generally employ a code disc mounted on the shaft upon which the analog information is impressed. The code disc is provided with one or more circular tracks concentrically disposed about the shaft axis, and each of the tracks is provided with a plurality of transparent sectors separated by opaque sectors. A light source is positioned on one side of the code disc, and a light responsive device is positioned on the opposite side of the code disc in the region of illumination of the code disc. In this manner, the light responsive device will respond to the illumination of the light source when a transparent sector of the code disc immediately confronts the light responsive device.

A single track analog to digital photoelectric encoder requires a single photoresponsive device, and the photoresponsive device produces an electrical pulse each time a transparent sector of the code disc is rotated past the photoresponsive device. A counting mechanism is utilized in conjunction with the photoresponsive device to count the number of pulses produced by rotation of the disc, and thereby to determine the shaft angle deviation.

A second type of photoelectric encoder utilizes a plurality of coaxial tracks on a code disc and a plurality of light responsive devices, one confronting each of the tracks. Further, the arc length of the transparent and opaque sectors of each of the tracks is different, thus dividing the code disc into a plurality of pie-shaped segments in which the transparent and opaque sectors of the tracks form unique combinations. The photoresponsive devices are disposed on a common radius of the code disc generally, such that the electrical responses of the photoresponsive devices indicates the segment of the code disc confronting this common axis, generally referred to as the readout axis.

It is necessary that the electrical responses of the photoresponsive devices be sampled at particular times, usually at fixed intervals in accordance with the requirements of the equipment with which the analog to digital encoder is to be utilized. The sampling interval may be achieved by an intermittent light source, or by electrically interrogating the photoresponsive devices, as disclosed in U.S. Pat. No. 3,023,406 of Edward M. Jones dated Feb. 27, 1962 and entitled "Optical Encoder."

In all types of photoelectric encoders, rotation of the code disc past the transition from transparent to opaque sectors or opaque to transparent sectors results in corresponding electrical signal variations from the photoresponsive device which has pronounced sloping sides, that is, the abrupt optical transition on the coded disc results in a gradual electrical transition. One of the reasons for the gradual electrical transition is that the photoresponsive device has a finite width measured in the direction of movement of the track confronting the photoresponsive device so that the abrupt optical transition does not occur with respect to the photoresponsive device. Additionally, photoresponsive devices are capacitive elements, this producing time constants. Further, under some circumstances there are optical limitations preventing an abrupt optical transition from dark to light or light to dark. For this reason, electronic devices are utilized to establish a threshold line of demarcation representing the optical transition on parts, disc, and unless the electrical response of the photoresponsive device exceeds the threshold guide the electronic device will not respond. In the U.S. Pat. No. 3,023,406, to Jones, and conventionally flip-flops are utilized to provide the threshold control.

It is an object of the present invention to provide an optical or photoelectric encoder utilizing a photoresponsive device which is nonlinear, that is, will either produce an output or no output, but will not produce intermediate output values. Further, it is an object of the present invention to provide an optical encoder which utilizes no electronic threshold devices, such as flip-flops.

The inventor has found that a light responsive switching diode may be utilized in an optical encoder for the light responsive devices described above, and the light responsive switching diode itself will establish the light threshold which will produce an electrical response.

The present invention is more fully described, and further and additional objects of the invention are set forth, with reference to the accompanying drawings, in which.

Figure 1:
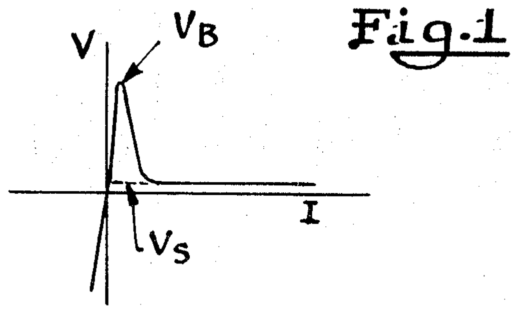
FIG. 1 is a graph illustrating the current-voltage characteristics of a PNPN switching diode.

FIG. 1 illustrates the relation of applied current to voltage for a PNPN switching diode. It is to be noted that in the positive region, an increase in voltage from zero will produce a relatively small current through the diode until a potential $V_B$ is reached. When the potential $V_B$, or a greater potential is applied to a PNPN switching diode, an avalanche occurs causing a rapid increase in current. As a result, a switching diode subjected to a potential in excess of the breakdown potential presents a low impedance in the circuit.

Figure 2:
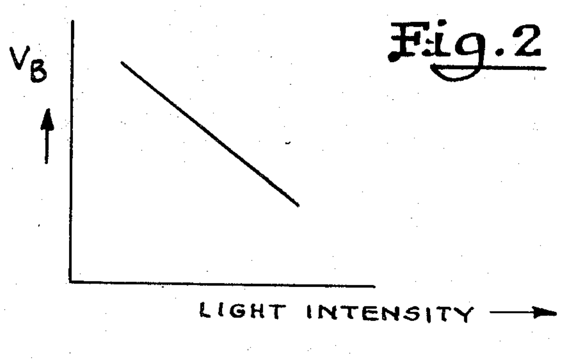
FIG. 2 is a graph illustrating the relationship between light intensity and the potential required for breakdown of the switching diode having the characteristics set forth in FIG. 1.

It has also been found that PNPN switching diodes are light sensitive and that the breakdown voltage $V_B$ is inversely related to light intensity, as indicated in FIG. 2. Hence, a switching diode may be utilized as a light sensitive detector by applying a bias potential to the switching diode which is less than the breakdown potential $V_B$ when the diode is in the dark, but which is greater than the breakdown potential $V_B$ when the diode is illuminated.

Figure 3:
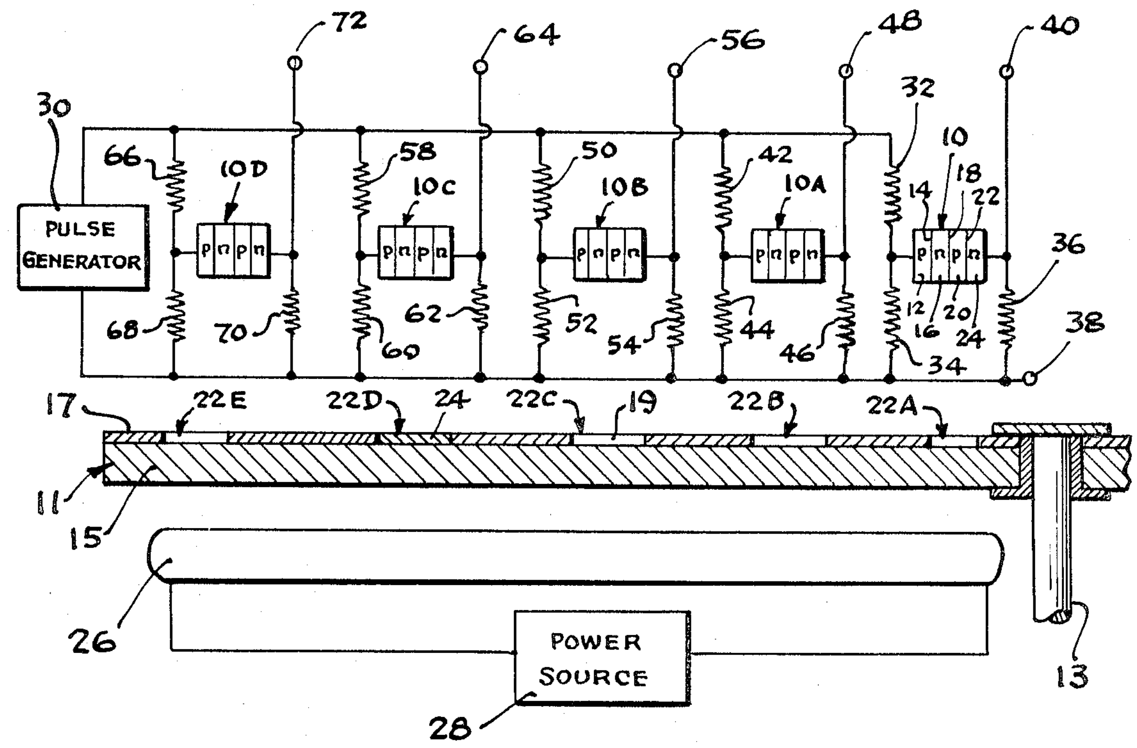
FIG. 3 is a schematic illustration of an optical encoder constructed according to the teachings of the present invention, the encoder producing a parallel output.

FIG. 3 illustrates a switching diode 10 as part of an encoder. The diode 10 has a region of semiconductor material of the P-type designated 12 which forms a first junction 14 with a region of N-type semiconducting material 16. Also, the N-type region 16 forms a junction 18 with a region 20 of P-type semiconducting material. The region 20 forms a third junction 22 with a region of N-type semiconducting material 24. The construction of switching diodes and their mode of operation is known to the art, and is described in "Semiconductor Junctions and Devices" by William B. Burford III and H. Grey Verner, McGraw-Hill Book Company, 1965. The two distinguishing characteristics of PNPN junction switching diodes are the necessity to apply the breakdown or breakover voltage $V_B$ to the diode in order to create an avalanche and to switch the diode from a high impedance device to a low impedance device, and the relatively low sustaining voltage, illustrated in FIG. 1 by the designation $V_S$, which will sustain the diode in conduction. The breakover voltage is carefully controlled in production as may be as high as 30 to 60 volts, while the sustaining voltage to maintain the diode as a low impedance device may be as low as 0.7 volt.

FIG. 3 illustrates the switching diode 10 utilized in an optical encoder. The optical encoder has a code disc 11 mounted on the shaft 13 which carries the analog information to be encoded. The code disc 11 has a flat circular transparent plate 15, which may be of glass or the like, and a layer 17 of opaque material confronting the PNPN switching diode 10, which also may be referred to as a photodiode. The layer 17 is provided with a plurality of transparent sectors 19 disposed in a plurality of coaxial tracks about the axis of the shaft 13, the tracks being designated 22A, 22B, 22C, 22D, and 22E. The transparent sectors in each of the tracks is separated by an opaque sector 24, as is conventional in code discs. The code disc 11 may be a straight binary code disc, such as illustrated in FIG.

6–18 of "Notes on Analog-Digital Conversion Techniques" by Alfred K. Susskind, the Massachusetts Institute of Technology, 1957, or it may be a trigonometric function code disc such as described in U.S. Pat. application Ser. No. 659,717, now U.S. Pat No. 3,484,159 of Edward M. Jones entitled "Nonlinear Code Member," or the like.

FIG. 3 illustrates a light source in the form of a lamp 26 confronting the side of the code disc 11 opposite the photodiode 10, and the lamp is provided with energy from a power source 28 to maintain the lamp under conditions of constant illumination.

Photodiode 10 confronts track 22A of the code disc 11, and each of the other tracks 22B, 22C, 22D and 22E is confronted by a photodiode 10A, 10B, 10C and 10D, respectively. The photodiodes are all disposed in a fixed position on an axis parallel to the code disc 11 and intersect the axis of the shaft 13, and hence at any moment of time, the photocells will receive light from the light source in the event a transparent sector 19 is confronting the photocells, but will be maintained in darkness in the event an opaque sector 24 is confronting the photocell.

Since the sustaining voltage $V_S$ is low for most photodiodes, the light transition from light to dark on a photodiode may not terminate the avalanche. For this reason, it is desirable that the bias voltage applied to the photodiode be in the form of a pulse. It is also desirable that the bias voltage applied to the photodiode be in the form of a pulse, since most computers require information as to the position of a shaft at fixed intervals, rather than continuously, and most computers require this information in the form of pulses. Hence, a pulse generator 30 is utilized to interrogate the photodiodes of the encoder of FIG. 3. The pulse generator 30 produces substantially square wave pulses of an amplitude in excess of the breakdown voltage of the photodiodes. A voltage divider utilizing resistors 32 and 34 is connected in parallel with the pulse generator 30, and the photodiode 10 is connected in a series circuit with a resistor 36 across the resistor 34. The voltage divider utilizing resistors 32 and 34 reduces the potential of the generated by the pulse generator 30 to a value less than the breakdown voltage $V_B$ of the photodiode 10 when the photodiode is in the dark, but greater than the breakdown voltage $V_B$ when the photodiode 10 is illuminated. As a result, a transparent sector 19 of the track 22A which is disposed in alignment with the lamp 26 and photodiode 10 at the moment of a pulse from the pulse generator 30 will result in the flow of current through the photodiode 10 and the resistor 36, thus resulting in a potential appearing between a common output terminal 38 and an output terminal 40 which represents the output of the track 22A of the encoder.

In like manner, a voltage divider consisting of serially connected resistors 42 and 44 is connnected across the pulse generator 30 to adjust the bias voltage for the photodiode 10A to a value less than the breakdown potential of the diode 10A when the diode 10A is in the dark and greater than the breakdown voltage of the diode 10A when the diode 10A is illuminated. The diode 10A is connnected in a series circuit with a resistor 46 across the resistor 44, and the output for the track 22B appears between the common output terminal 38 and an output terminal 48 connected to the junction of the resistor 46 and the photodiode 10A.

Further, a voltage divider consisting of resistors 50 and 52 is utilized to adjust the bias potential for photodiode 10B, and photodiode 10B is connected in a series circuit with an output resistor 54 across the resistor 52. The output for the track 22C appears between the common terminal 38 and an output terminal 56 connected to the junction of the photodiode 10B and the resistor 54. A voltage divider consisting of resistors 58 and 60 is utilized to adjust the bias potential for the photodiode 10C, and the photodiode 10C is connected in a series circuit with a resistor 62 across the resistor 60. The output for track 22D appears on output terminal 64. A voltage divider utilizing resistors 66 and 68 is employed for the photodiode 10D, and the photodiode 10D is connected in a series circuit with a resistor 70 across resistor 68. The output for track 22E appears on output terminal 72.

It is to be noted that the encoder of FIG. 3 simply requires a network of three resistors in combination with a photodiode to produce a positive "1" for illuminated and "0" for cells in the dark. No trigger circuit, or other threshold device is utilized in the encoder. Further, a parallel output is obtained at the frequency of the pulse generator 30, which may be selected in accordance with the application of the encoder.

Figure 4:
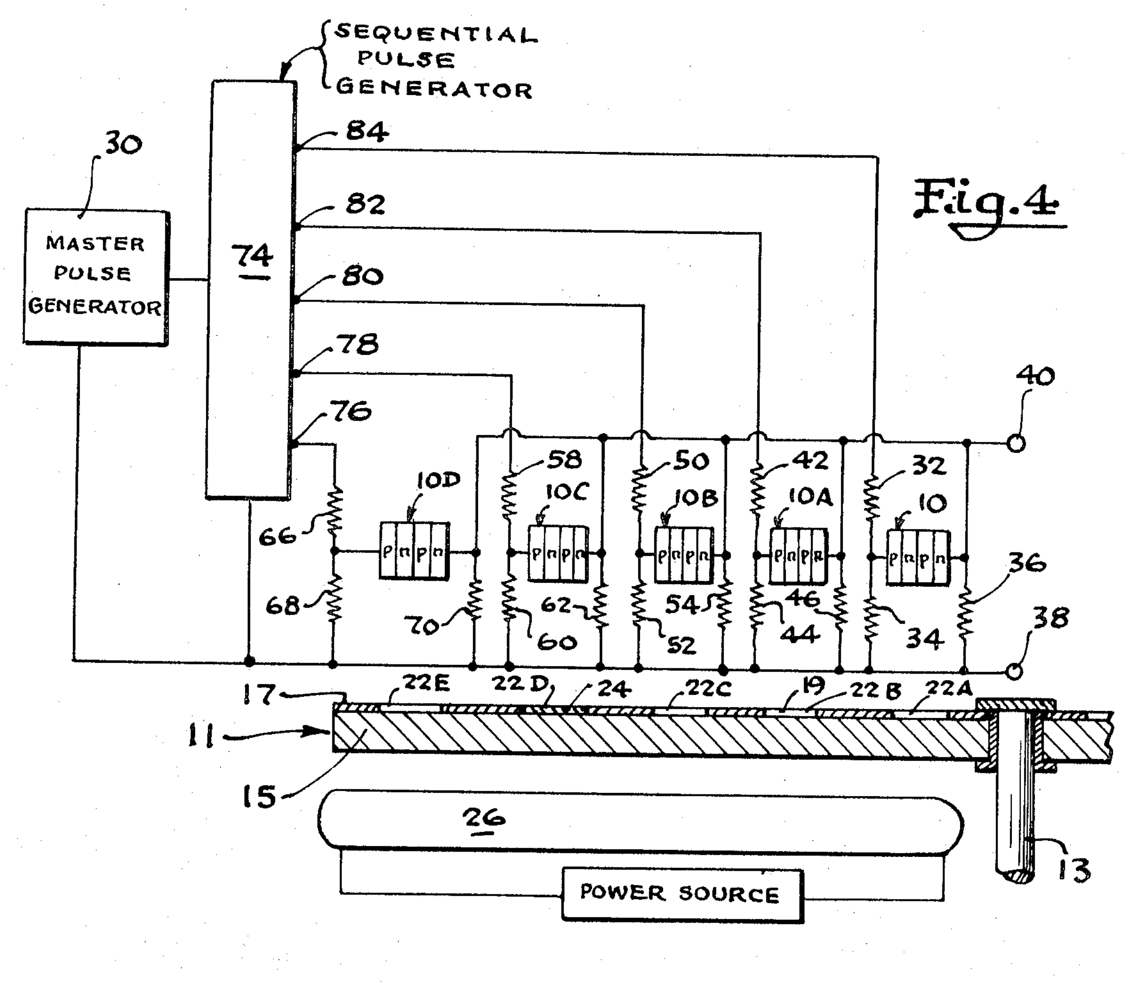
FIG. 4 is a schematic diagram illustrating an optical encoder constructed according to the teachings of the present invention producing a sequential output.

FIG. 4 illustrates a sequential encoder utilizing photodiodes. In FIG. 4, a master pulse generator, which may be identical with the pulse generator 30 of FIG. 3 and bears the same reference numeral, is utilized to generate a chain of pulses for interrogating the photodiodes. The master pulse generator is electrically connected to the input terminal of a sequential pulse generator 74. The sequential pulse generator 74 has output terminals designated 76, 78, 80, 82 and 84, and for each pulse the sequential pulse generator receives from the master pulse generator 30, the sequential pulse generator 74 produces a pulse on one and only one of the output terminals thereof. Hence, the output terminals 76, 78, 80, 82 and 84 receive pulses in sequence.

The circuits for the photodiodes of the encoder of FIG. 4 are virtually identical to those illustrated in the encoder of FIG. 3, and identical elements bear the same reference numerals. The voltage divider consisting of resistors 32 and 34 for the photodiode 10 is connected between the terminal 84 of the sequential pulse generator and a common terminal thereof to apply the bias potential on the photodiode 10. As in the encoder of FIG. 3, the output of the photodiode 10 appears on the output terminal 40.

The bias potential for the voltage divider consisting of resistors 42 and 44 for photodiode 10A is connected between the output terminal 82 of the sequential pulse generator 74 and the common output terminal thereof. The output for the photodiode 10A, however, is also connected to the output terminal 40.

In like manner, the voltage divider for the photodiode 10B is connected across the output terminal 80 and the common terminal of the sequential pulse generator 74. The output for the photodiode 10B is also connected to the output terminal 40. The output for the photodiode 10C also is connected to the common output terminal 40, and the voltage divider for the photodiode 10C is connected between the output terminal 78 and the common output terminal of the sequential pulse generator. The output of the photodiode 10D is also connected to the common output terminal 40, and the voltage divider of the photodiode 10D is connected between the common output terminal and the output terminal 76 of the sequential pulse generator.

For each pulse from the master pulse generator 30, the sequential pulse generator 74 generates a chain of pulses, one pulse appearing on each of the output terminals 76, 78, 80, 82 and 84. Hence, for each photodiode subjected to illumination, an electrical pulse will appear between the output terminal 38 and 40 at that time when that photodiode is subjected to a pulse from the sequential pulse generator 74. In this manner, the output of the encoder is obtained on only two conductors, namely the output terminals 38 and 40. Hence, the encoder produces a sequential output, as taught by U.S. Pat. No. 3,023,406 of Edward M. Jones entitled "Optical Encoder," issued Feb. 27, 1962.

It will be recognized that there is no advantage to using a pulsed light source in an encoder constructed in the manner set forth in FIG. 3 or FIG. 4, since it is necessary to remove the bias from the photodiodes after the photodiode has been sampled in order to be certain that the photodiode will cease conducting. Therefore, the present invention has the advantage of utilizing a constant light source which is substantially less expensive and more reliable.

Those skilled in the art will devise many modifications for the present invention within the intended scope thereof. For example, the present invention may be practiced with counter-type encoders as well as sequential and parallel readout encoders. It is therefore intended that the scope of the present invention be not limited by the foregoing specification, but rather only by the appended claims.

1. An analog to digital encoder comprising, in combination: a code member adapted to move responsive to the analog information to be encoded, said code member having a track consisting of a plurality of transparent sectors and opaque sectors, each transparent sector being separated from adjacent transparent sectors by an opaque sector, a light source mounted in a fixed position relative to the code member and confronting a portion of the code member to illuminate said portion of the code member, and a photoresponsive device mounted on the side of the code member opposite the light source aligned with the track of the code member and the light source, characterized by the improved construction wherein the photoresponsive device comprises a PNPN switching diode disposed in alignment with the track and light source and an electrical pulse generator electrically connected in series with the switching diode, said switching diode being photoresponsive and having a breakover voltage inversely related to the intensity of illumination falling on said switching diode, a voltage divider connected between the pulse generator and the switching diode, said voltage divider comprising a first resistor and a second resistor connected in series across the pulse generator and the switching diode being in a circuit electrically connected in parallel with the second resistor, said pulse generator impressing a voltage on said switching diode greater than the breakover voltage of the switching diode when illuminated by the light source and less than the breakover voltage of the switching diode when in the dark, and an output terminal operatively associated with said switching diode circuit.

2. An analog to digital encoder comprising, in combination: a code member adapted to move responsive to the analog information to be encoded, said code member having a plurality of parallel tracks, each track having a plurality of transparent sectors separated by opaque sectors, the length of the sectors of the track being different and dividing the track into a plurality of segments along the tracks of unique combinations of transparent sectors and opaque sectors, a light source mounted in a fixed position relative to the code member and confronting a portion of the code member to illuminate said portion of the code member, and a plurality of photoresponsive devices mounted on the side of the code member opposite the light source, a separate photoresponsive device being aligned with each track of the code member and the light source, characterized by the improved construction where each of the photoresponsive devices comprises a PNPN switching diode and an electrical pulse generator electrically connected in a separate series circuit with each of the photoresponsive switching diodes, each of said separate series circuits including a voltage divider comprising a first resistor and a second resistor connected in series across the pulse generator, the switching diode being in a circuit, including a third resistor, electrically connected in parallel with the second resistor, each switching diode being photoresponsive and having a breakover voltage inversely related to the intensity of illumination falling on the said switching diode, said pulse generator impressing a voltage on each of said switching diodes greater than the breakover voltage of said switching diode when illuminated by the light source and less than the breakover voltage of each said switching diode when said switching diode is in the dark, and output means operatively associated with each switching diode circuit.

3. An analog to digital encoder comprising the combination of claim 2 wherein the encoder is provided with separate output terminals for each track of the code member, each of said output terminals being electrically connected to a different one of said third resistors connected in a series circuit with one of the switching diodes and the pulse generator.

4. An analog to digital encoder comprising the combination of claim 2 wherein the pulse generator has a plurality of output terminals, a different one of said output terminals being electrically connected to the voltage divider of each photoresponsive switching diode, said pulse generator generating pulses on said different output terminals in sequence, and a common pair of output terminals electrically connected in a series circuit with all of the said third resistors connected in series circuits with the pulse generator and switching diodes.

PO-1050
(5/69)

UNITED STATES PATENT OFFICE
CERTIFICATE OF CORRECTION

Patent No. 3,614,775 Dated October 19, 1971

Inventor(s) JOHN BREAN

It is certified that error appears in the above-identified patent and that said Letters Patent are hereby corrected as shown below:

Column 1, line 37 after "generally,", delete "such" and insert --so--.

Column 1, line 66 after "on", delete "parts," and insert --the--.

Column 1, line 68 after "threshold", delete "guide" and insert --value--.

Column 2, line 41 before"part", insert --a--.

Column 2, line 60 after "production, delete "as" and insert --and--.

Signed and sealed this 11th day of April 1972.

(SEAL)
Attest:

EDWARD M.FLETCHER,JR.
Attesting Officer

ROBERT GOTTSCHALK
Commissioner of Patents